United States Patent
Zhang

(10) Patent No.: US 11,006,329 B2
(45) Date of Patent: May 11, 2021

(54) METHOD AND DEVICE IN UE AND BASE STATION USD FOR WIRELESS COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 15/963,190

(22) Filed: Apr. 26, 2018

(65) Prior Publication Data

US 2018/0317140 A1    Nov. 1, 2018

(30) Foreign Application Priority Data

Apr. 27, 2017 (CN) .......................... 201710289194.5

(51) Int. Cl.
*H04W 36/00* (2009.01)
*H04W 56/00* (2009.01)

(52) U.S. Cl.
CPC ....... *H04W 36/0055* (2013.01); *H04W 36/03* (2018.08); *H04W 56/001* (2013.01)

(58) Field of Classification Search
CPC . H04W 36/055; H04W 36/03; H04W 56/001; H04W 36/0027; H04W 36/0055;
(Continued)

(56) References Cited

U.S. PATENT DOCUMENTS 8,902,935 B2 * 12/2014 Kim .................... H04J 11/0079
370/324
10,205,567 B2 * 2/2019 Berggren ............ H04W 72/005
(Continued)

FOREIGN PATENT DOCUMENTS

CN 104159304 A 11/2014
CN 104812057 Y 7/2015

OTHER PUBLICATIONS

Evolved Universal Terrestrial Radio Access (E-UTRA), 3GPP TS 36.211 V15.5.0, Section 9.0, Mar. 2019.
(Continued)

*Primary Examiner* — Asad M Nawaz
*Assistant Examiner* — Kai Chang
(74) *Attorney, Agent, or Firm* — Maschoff Brennan

(57) ABSTRACT

The present disclosure discloses a method and a device in a User Equipment (UE) and a base station used for wireless communication. The UE first receives a first signaling and a second radio signal, and then processes a first radio signal by a first operation. The first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence. The first operation is transmitting, or the first operation is receiving. According to the present disclosure, both system performance and transmission efficiency are improved.

20 Claims, 5 Drawing Sheets

(58) Field of Classification Search
CPC ............. H04W 36/0083; H04W 36/30; H04W 72/041; H04L 5/0053
See application file for complete search history.

(56) References Cited

U.S. PATENT DOCUMENTS

| | | | | |
|---|---|---|---|---|
| 2012/0099565 | A1* | 4/2012 | Kim | H04L 5/001 370/336 |
| 2014/0198747 | A1* | 7/2014 | Ouchi | H04L 5/0053 370/329 |
| 2017/0006508 | A1* | 1/2017 | Moon | H04W 36/0072 |
| 2017/0055224 | A1 | 2/2017 | Boccardi et al. | |
| 2017/0127367 | A1* | 5/2017 | Axnas | H04W 72/0446 |
| 2017/0142703 | A1* | 5/2017 | Xue | H04W 72/0453 |
| 2017/0164247 | A1* | 6/2017 | Wiemann | H04W 36/0066 |
| 2017/0215119 | A1* | 7/2017 | Hong | H04W 36/08 |
| 2017/0280331 | A1* | 9/2017 | Gou | H04L 27/0006 |
| 2017/0331670 | A1* | 11/2017 | Parkvall | H04W 52/0274 |
| 2018/0007726 | A1* | 1/2018 | Li | H04W 48/16 |
| 2018/0091980 | A1* | 3/2018 | Sun | H04W 16/14 |
| 2018/0139710 | A1* | 5/2018 | Li | H04W 56/00 |
| 2018/0220360 | A1* | 8/2018 | Sheng | H04W 48/10 |
| 2018/0270776 | A1* | 9/2018 | Yasukawa | H04W 56/0025 |
| 2018/0295009 | A1* | 10/2018 | Lindoff | H04L 27/2663 |
| 2018/0295590 | A1* | 10/2018 | Abedini | H04L 5/0051 |
| 2018/0324730 | A1* | 11/2018 | Lee | H04B 7/0486 |
| 2019/0098589 | A1* | 3/2019 | Chae | H04W 72/042 |

OTHER PUBLICATIONS

CN 1st Office Action received in application No. 201710289194.5 dated Jul. 16, 2020.
CN 1st Search Report received in application No. 201710289194.5 dated Jul. 10, 2020.
3GPP TSG RAN WG1 NR Ad-hoc Meeting R1-1701038 ITL Considerations on Sequence Design for Synchronization Signal.

* cited by examiner

METHOD AND DEVICE IN UE AND BASE STATION USD FOR WIRELESS COMMUNICATION

CROSS REFERENCE TO RELATED DISCLOSURE

This disclosure claims the priority benefit of Chinese Patent Application 201710289194.5, filed on Apr. 27, 2017, which is incorporated herein by reference.

BACKGROUND

Technical Field

The present disclosure relates to transmission methods and devices in wireless communications, and in particular to a method and a device for communication between an aerial vehicle and a ground terminal.

Related Art

Device to Device (D2D) communication is approved as an approved project and discussed in 3rd Generation Partner Project (3GPP) Release 12. The essential characteristic of D2D is to allow data transmission between User Equipment (UE). In traditional D2D communications, the application of D2D is mainly based on broadcasting transmission of public safety information. When a resident cell for D2D UEs changes, all the D2D UEs need to perform cell reselection.

The Study Item (SI) about Enhanced Support for Aerial Vehicles is agreed as an approved project in the discussion of 3GPP about 5G and is discussed in 3GPP. Aerial communication is characterized in that an aerial vehicle has a fast movement speed and the services applied by the aerial vehicle are those types of services based on unicast having high demand on stability and time delay. Therefore, cell Handover (HO) methods for aerial vehicles and ground terminals need to be reconsidered.

SUMMARY

An important characteristic of aerial communication is that aerial vehicles have a fast movement speed. When an aerial vehicle reaches certain height, the aerial vehicle and the ground terminal/base station generally have a Line of Sight (LOS) path. Due to the reasons of mobility and LOS, when an aerial vehicle moves fast, the aerial vehicle would hand over frequently among a plurality of cells if based on current handover criteria.

In view of the above problems, in one embodiment, one solution is to adopt the legacy cell handover method in D2D, that is, the D2D UE reinitiates a cell reselection process at each handover. However, this method has an obvious problem that cell reselection implies reestablishment of connection. Reestablishment of connection also implies interruption of data channel transmission. Obviously, the frequent interruption of data channel transmission caused by the high-speed movement of aerial vehicles cannot meet the application requirements of communication of the aerial vehicles.

In view of the above problems, the present disclosure provides a solution. It should be noted that the embodiments of the present disclosure and the characteristics in the embodiments may be mutually combined if no conflict is caused. For example, the embodiments of the UE of the present disclosure and the characteristics in the embodiments may be applied to the base station if no conflict is caused, and vice versa.

The present disclosure provides a method in a User Equipment (UE) used for wireless communication. The method includes the following steps:
receiving a first signaling and a second radio signal; and
processing a first radio signal by a first operation.

Herein, the first signaling is correlated to a first synchronization sequence, the first signaling is used for determining at least one of {first signature sequence, second synchronization sequence}, and the first signature sequence is used for generating the first radio signal; the receiving timing of the second radio signal is used for determining the transmitting timing of the first radio signal; the second radio signal is associated with the second synchronization sequence, the first synchronization sequence differs from the second synchronization sequence; the first operation is transmitting, or the first operation is receiving; a transmitter of the first signaling corresponds to a first node, and a transmitter of the second radio signal corresponds to a second node.

In one embodiment, the above method is characterized in that the first signaling is used for configuring resources occupied by the D2D transmission after the UE initiates handover, and that the configuration of the resources is done by a target cell for the handover of the UE. Thus, interruption of D2D transmission is avoided during the handover process of UE, and interference caused by the D2D transmission of UE to the uplink transmission in the target cell is avoided too.

In one embodiment, the above method is characterized in that the target cell transmits the second radio signal, and the D2D transmission during the handover process of UE synchronizes with the target cell. Thus, interference to the uplink data of the target cell is further avoided.

In one embodiment, the first radio signal is transmitted on a first time-frequency resource set, and the first signaling is used for determining the first time-frequency resource set.

In one subembodiment, the first signaling explicitly indicates the first time-frequency resource set.

In one embodiment, the first node is a base station.

In one embodiment, the first node is a serving cell corresponding to the UE.

In one embodiment, the second node is a base station.

In one embodiment, the second node is a neighbor cell of the serving cell corresponding to the UE.

In one embodiment, the first radio signal is transmitted on a PC5 link.

In one embodiment, the first synchronization sequence corresponds to a first identity and the second synchronization sequence corresponds to a second identity. The first identity differs from the second identity.

In one subembodiment, the first identity is a Physical Cell Identifier (PCI).

In one subembodiment, the second identity is a PCI.

In one embodiment, the given synchronization sequence includes at least one of {Primary Synchronization Signal (PSS), Secondary Synchronization Signal (SSS)}. The given synchronization sequence is one of {first synchronization sequence, second synchronization sequence}.

In one embodiment, the second radio signal includes at least one of {PSS, SSS}.

In one embodiment, the first signaling indicates a first feature identity, and the first feature identity is used for generating the first signature sequence.

In one subembodiment, the first feature identity is a Sidelink Synchronization Sequence Identity (SLSSID).

In one subembodiment, the first feature identity is an integer not smaller than 0 and not greater than 167.

In one subembodiment, the first signaling includes an SL-SyncConfig IE (Information Elements) in TS 36.331.

In one subembodiment, the act that the first feature identity is used for generating the first signature sequence refers that the first feature identity is used for initializing a generator of the first signature sequence.

In one dependent embodiment, the first radio signal includes a Primary Sidelink Synchronization Signal (PSSS), the first feature identity corresponds to $N_{ID}^{SL}$ in TS 36.211, and the first signature sequence corresponds to $d_i(n)$ in Section 9.7.1 in TS 36.211.

In one dependent embodiment, the first radio signal includes a Secondary Sidelink Synchronization Signal (SSSS), the first feature identity corresponds to $N_{ID}^{SL}$ in TS 36.211, and the first signature sequence corresponds to $d_i(n)$ in Section 9.7.2 in TS 36.211.

In one embodiment, the first signaling is a physical layer signaling.

In one subembodiment, the physical layer signaling is Downlink Control Information (DCI).

In one embodiment, the first signaling is a high layer signaling.

In one subembodiment, the high layer signaling is a Radio Resource Control (RRC) signaling.

In one dependent embodiment, the RRC signaling is UE specific.

In one embodiment, the first operation is transmitting, and the UE is an opposite-paired UE of a ground terminal.

In one subembodiment, the opposite-paired UE is a ground terminal.

In one subembodiment, the opposite-paired UE is a terminal used for terrestrial radio access.

In one embodiment, the first operation is transmitting, and the UE is an opposite-paired UE of an aerial vehicle.

In one subembodiment, the opposite-paired UE is a ground terminal.

In one subembodiment, the opposite-paired UE is a terminal used for terrestrial radio access.

In one embodiment, the first operation is receiving, and the UE is an aerial vehicle.

In one embodiment, the first operation is receiving, and the UE is a ground terminal.

In one embodiment, the given synchronization sequence is generated after passing through {Resource Element Mapper, Orthogonal Frequency Division Multiplexing (OFDM) Symbol Generator} in sequence. The given synchronization sequence is the first synchronization sequence, or the given synchronization sequence is the second synchronization sequence.

In one embodiment, the given synchronization sequence is generated after passing through {Precoding, Resource Element Mapper, OFDM Symbol Generator} in sequence. The given synchronization sequence is the first synchronization sequence, or the given synchronization sequence is the second synchronization sequence.

In one embodiment, the cell in the present disclosure corresponds to a cell in Long-Term Evolution (LTE).

In one embodiment, the cell in the present disclosure corresponds to a cell in 5G.

In one embodiment, the cell in the present disclosure corresponds to a base station in 5G.

In one embodiment, the cell in the present disclosure corresponds to a Transmission Reception Point (TRP) in 5G.

In one embodiment, the node in the present disclosure corresponds to a cell in LTE.

In one embodiment, the node in the present disclosure corresponds to cell in 5G.

In one embodiment, the node in the present disclosure corresponds to a base station in 5G.

In one embodiment, the node in the present disclosure corresponds to a TRP in 5G.

In one embodiment, the act that the receiving timing of the second radio signal is used for determining the transmitting timing of the first radio signal refers that the UE selects the transmitter of the second radio signal as a synchronization reference source.

In one embodiment, the act that the receiving timing of the second radio signal is used for determining the transmitting timing of the first radio signal refers that the UE selects the transmitter of the second radio signal as a synchronization reference source and selects the second radio signal as a timing reference of the first radio signal.

According to one aspect of the present disclosure, the above method includes the following steps:

processing first information by a first execution.

Herein, at least one of {channel measurement for third link, channel measurement for fourth link} is used for determining the first information; a radio channel from the first node to a transmitter of the first information corresponds to the third link, and a radio channel from the second node to the transmitter of the first information corresponds to the fourth link; the first operation is transmitting and the first execution is receiving, or the first operation is receiving and the first execution is transmitting.

In one embodiment, the above method is characterized in that the third link corresponds to a link from the serving cell to the aerial vehicle, the fourth link corresponds to a link from the target cell of the handover to the aerial vehicle, and the first information is used for determining the measurement results about the serving cell and the target cell for the aerial vehicle, thereby determining whether the aerial vehicle initiates handover.

In one embodiment, the above method is advantageous in that, when a D2D pair initiates handover, the channel measurement results about the serving cell and the neighbor cell for each UE in the D2D pair both need to be considered.

In one embodiment, the first information includes a first event identity.

In one subembodiment, the first event identity is an eventID in TS 36.331.

In one embodiment, the first information includes at least one of {channel measurement for third link, channel measurement for fourth link}.

In one embodiment, the first information is used for determining a relationship between the channel measurement result for the third link and the channel measurement result for the fourth link.

In one embodiment, a third parameter is a result of channel measurement for the third link, and a fourth parameter is a result of channel measurement for the fourth link.

In one subembodiment, the third parameter is one of {Reference Signal Received Power (RSRP), Reference Signal Received Quality (RSRQ), Received Signal Strength Indicator (RSSI), Signal to Noise Rate (SNR)}.

In one subembodiment, the fourth parameter is one of {RSRP, RSRQ, RSSI, SNR}.

In one subembodiment, the third parameter is in unit of dBm.

In one subembodiment, the fourth parameter is in unit of dBm.

In one subembodiment, the first information is used for determining that the third parameter is less than the fourth parameter.

In one subembodiment, the first information is used for determining that the sum of the third parameter and a second offset value is less than the fourth parameter. The second offset value is fixed, or the second offset value is configured by the high layer signaling.

In one dependent embodiment, the second offset value is in unit of dB.

In one subembodiment, the first information is used for determining at least one of {the third parameter is less than a third threshold, the fourth parameter is greater than a fourth threshold}. The third threshold is fixed, or the third threshold is configured by the high layer signaling. The fourth threshold is fixed, or the fourth threshold is configured by the high layer signaling.

In one embodiment, the first information includes a MeasurementReport message in TS 36.331.

In one embodiment, the first information includes a measResults IE in TS 36.331.

In one embodiment, the first information includes a PCI corresponding to the second node.

In one embodiment, the first information includes the second identity in the present disclosure.

According to one aspect, the above method includes the following steps:

processing a second signaling by a first operation.

Herein, the second signaling is used for triggering the transmission of the first information; at least one of {channel measurement for first link, channel measurement for second link} is used for determining the second signaling; a radio channel from the first node to the transmitter of the first radio signal corresponds to the first link, and a radio channel from the second node to the transmitter of the first radio signal corresponds to the second link; the first execution is receiving and the first operation is transmitting, or the first execution is transmitting and the first operation is receiving.

In one embodiment, the above method is characterized in that the second signaling is used for triggering the transmission of the first information, and at least one of {channel measurement for first link, channel measurement for second link} is used for determining the second signaling. When the first link corresponds to a link from the ground terminal to the serving cell, the second link corresponds to a link from the ground terminal to a neighbor cell. When the ground terminal is the first to perceive that it needs to perform handover, the ground terminal will request the opposite-paired aerial vehicle to transmit the first information.

In one embodiment, the above method is advantageous in that, taking the fast movement speed of the aerial vehicle and the LOS into account, the handover of the aerial vehicle follows the handover of the ground terminal, to avoid the risk of frequent handover.

In one embodiment, the above method is further advantageous in that handover is performed only when both the ground terminal and the aerial vehicle meet the conditions of handover. Thus the stability and efficiency of handover are improved.

In one embodiment, the second signaling is a physical layer signaling.

In one embodiment, the second signaling is Sidelink Control Information (SCI).

In one embodiment, at least one of {channel measurement for first link, channel measurement for second link} is used for triggering the transmission of the second signaling.

In one embodiment, a first parameter is a result of channel measurement for the first link, and a second parameter is a result of channel result for the second link. If the first parameter and the second parameter meet a first condition, the UE transmits the second signaling. Otherwise, the UE does not transmit the second signaling.

In one subembodiment, the first parameter is one of {RSRP, RSRQ, RSSI, SNR}.

In one subembodiment, the second parameter is one of {RSRP, RSRQ, RSSI, SNR}.

In one subembodiment, the first parameter is in unit of dBm.

In one subembodiment, the second parameter is in unit of dBm.

In one subembodiment, the first condition is that the first parameter is less than the second parameter.

In one subembodiment, the first condition is that the sum of the first parameter and a first offset value is less than the second parameter. The first offset value is fixed, or the first offset value is configured by the high layer signaling.

In one dependent embodiment, the first offset value is in unit of dB.

In one subembodiment, the first condition includes at least one {the first parameter is less than a first threshold, the second parameter is greater than a second threshold}. The first threshold is fixed, or the first threshold is configured by the high layer signaling. The second threshold is fixed, or the second threshold is configured by the high layer signaling.

According to one aspect of the present disclosure, the above method includes the following steps:

transmitting second information.

Herein, the first information is used for determining the second information; the second information is used for determining the first signaling; and the first operation is transmitting.

In one embodiment, the above method is characterized in that the ground terminal considers the channel measurement results of the aerial vehicle and the ground terminal simultaneously and then triggers handover through the second information.

In one embodiment, the second information includes {second identity, first simplified information}. The second identity is used for determining the transmitter of the second radio signal. The first information is used for determining the first simplified information.

In one subembodiment, the second identity is the ID of the transmitter of the second radio signal.

In one subembodiment, the second identity is a PCI.

In one subembodiment, the first information includes a given EventID, and the first simplified information is the given EventID.

In one embodiment, the second information includes the first information.

In one embodiment, the second information includes at least one of {first parameter, second parameter}. The first parameter is a result of channel measurement for the first link. The second parameter is a result of channel measurement for the second link.

In one embodiment, the second information includes a third identity, and the third identity is used for determining the transmitter of the first information.

In one subembodiment, the third identity is a Cell Radio Network Temporary Identity (C-RNTI) of the transmitter of the first information.

In one subembodiment, the third identity is an SAE Temporary Mobile Subscriber Identity (TMSI) of the transmitter of the first information, wherein SAE is the abbreviation of System Architecture Evolution.

In one subembodiment, the third identity is an International Mobile Subscriber Identification Number (IMSI) of the transmitter of the first information.

In one embodiment, the second information is used for triggering the transmission of the first signaling.

In one embodiment, the second information includes a second EventID.

In one embodiment, the second information includes a MeasurementReport Message in TS 36.331.

In one embodiment, the second information includes a measResults IE in TS 36.331.

According to one aspect of the present disclosure, the above method is characterized in that the first node and the second node are non-co-sited.

In one embodiment, the first node and the second node being non-co-sited refers that the first node and the second node are two different communication facilities.

In one embodiment, the first node and the second node being non-co-sited refers that the first node and the second node correspond to two different PCIs, respectively.

In one embodiment, the first node and the second node being non-co-sited refers that the first node and the second node are located in different places.

In one embodiment, a backhaul link exists between the first node and the second node.

According to one aspect of the present disclosure, the above method includes the following steps:

handing over from a first cell to a second cell; and
processing a third radio signal by a first operation.

Herein, the first cell refers to the first node, the second cell refers to the second node, and the receiving timing for the second cell is used for determining the transmitting timing of the third radio signal.

In one embodiment, the act that the receiving timing for the second cell is used for determining the transmitting timing of the third radio signal refers that the UE selects the second cell as a synchronization reference source.

In one embodiment, the act that the receiving timing for the second cell is used for determining the transmitting timing of the third radio signal refers that the UE selects the second cell as a synchronization reference source and selects a target radio signal transmitted by the second cell as the timing reference of the first radio signal.

In one subembodiment, the target radio signal is the second radio signal.

In one embodiment, the third radio signal includes at least one of {PSSS, SSSS}.

In one embodiment, a physical layer channel corresponding to the third radio signal is one of {Physical Sidelink Shared Channel (PSSCH), Physical Sidelink Control Channel (PSCCH), Physical Sidelink Discovery Channel (PSDCH), Physical Sidelink Broadcasting Channel (PSBCH)}.

In one embodiment, a transmission channel corresponding to the third radio signal is one of {Sidelink Shared Channel (SL-SCH), Sidelink Discovery Channel (SL-DCH), Sidelink Broadcast Channel (SL-BCH)}.

In one embodiment, the UE further executes the following steps: detaching from the first cell and establishing synchronization with the second cell.

In one embodiment, the UE further executes the following steps: receiving broadcast information and system messages from the second cell.

The present disclosure discloses a method in a base station used for wireless communication. The method includes the following steps:

transmitting a first signaling or transmitting a second radio signal.

Herein, the first signaling is correlated to a first synchronization sequence, the first signaling is used for determining at least one of {first signature sequence, second synchronization sequence}, and the first signature sequence is used for generating a first radio signal; the receiving timing of the second radio signal is used for determining the transmitting timing of the first radio signal; the second radio signal is associated with the second synchronization sequence, the first synchronization sequence differs from the second synchronization sequence.

In one embodiment, the base station transmits the first signaling. The base station corresponds to the first node in the present disclosure.

In one embodiment, the base station transmits the second radio signal. The base station corresponds to the second node in the present disclosure.

According to one aspect of the present disclosure, the above method includes the following steps:

receiving second information.

Herein, the base station transmits the first signaling; a piece of first information is used for determining the second information; the second information is used for determining the first signaling; at least one of {channel measurement for third link, channel measurement for fourth link} is used for determining the first information; a radio channel from the transmitter of the first signaling to a transmitter of the first information corresponds to the third link, and a radio channel from the transmitter of the second radio signal to the transmitter of the first information corresponds to the fourth link.

According to one aspect of the present disclosure, the above method is characterized in that the second signaling is used for triggering the transmission of the first information; at least one of {channel measurement for first link, channel measurement for second link} is used for determining the second signaling; a radio channel from the transmitter of the first signaling to a transmitter of the first radio signal corresponds to the first link, and a radio channel from the transmitter of the second radio signal to the transmitter of the first radio signal corresponds to the second link.

According to one aspect of the present disclosure, the above method includes the following steps:

processing third information by a second operation; and
processing fourth information by a second execution.

Herein, the second information is used for determining the third information; the third information is transmitted on a backhaul link; the third information is used for determining that at least the former one of {the transmitter of the first radio signal, the transmitter of the first information} initiates a handover request; the fourth information is used for acknowledging that the third information is correctly received. The fourth information is used for determining at least the first signature sequence; the fourth information is transmitted on the backhaul link; the base station transmits the first signaling, the second operation is transmitting, and the second execution is receiving; or the base station transmits the second radio signal, the second operation is receiving and the second execution is transmitting.

In one embodiment, the above method is characterized in that the third information and the fourth information are used for information interaction on the backhaul link during the handover process of the aerial vehicle and the ground terminal in the present disclosure.

In one embodiment, the fourth information explicitly indicates the first time-frequency resource set in the present disclosure.

In one embodiment, the fourth information explicitly indicates the first signature sequence.

In one embodiment, the third information includes a third identity. The third identity is used for determining the transmitter of the first information.

In one subembodiment, the third identity is one of {UE ID, S-TMSI, TMSI}.

In one embodiment, the third information includes a fourth identity. The fourth identity is used for determining the transmitter of the second information.

In one subembodiment, the fourth identity is one of {UE ID, S-TMSI, TMSI}.

In one embodiment, the third information includes the first EventID in the present disclosure.

In one embodiment, the third information includes the second EventID in the present disclosure.

In one embodiment, the third information includes a HANDOVER REQUEST in TS 36.423.

In one embodiment, the fourth information includes a HANDOVER REQUEST ACKNOWLEDGE in TS 36.423.

In one embodiment, the backhaul link employs one interface in {X2, S1}.

According to one aspect of the present disclosure, the above method is characterized in that the transmitter of the first signaling and the transmitter of the second radio signal are non-co-sited.

According to one aspect of the present disclosure, the above method includes the following steps:

detaching a first terminal and a second terminal from a first cell, or establishing two connections for the first terminal and the second terminal in the second cell respectively.

Herein, the base station transmits the first signaling, the base station detaches the first terminal and the second terminal from the first cell, the first cell refers to a serving cell corresponding to the transmitter of the first signaling; or the base station transmits the second radio signal, the base station establishes two connections for the first terminal and the second terminal respectively in the second cell, the second cell refers to a serving cell corresponding to the transmitter of the second radio signal; the first terminal is the transmitter of the first radio signal, and the second terminal is the transmitter of the first information.

In one embodiment, the base station detaches the first terminal and the second terminal from the first cell. The base station further executes the following step: transmitting the RRCConnectionReconfiguration information in TS36.331 to the first terminal and the second terminal respectively. The RRCConnectionReconfiguration information includes a mobilityControlInformation IE.

In one embodiment, the base station detaches the first terminal and the second terminal from the first cell. The base station further executes the following step: transmitting the SN STATUS TRANSFER information in TS36.423.

In one embodiment, the base station establishes two connections for the first terminal and the second terminal respectively in the second cell. The base station further executes the following step: establishing two RRC connections for the first terminal and the second terminal respectively in the second cell respectively.

In one embodiment, the base station establishes two connections for the first terminal and the second terminal respectively in the second cell. The base station further executes the following step: receiving SN STATUS TRANSFER information from the first cell.

In one embodiment, the third operation is to establish a connection for the first terminal and the second terminal in the second cell. The base station further executes the following step: receiving SN STATUS TRANSFER information from the first cell.

The present disclosure discloses a UE used for wireless communication. The UE includes:

a first processing module, to receive a first signaling and a second radio signal; and a second processing module, to process a first radio signal by a first operation.

Herein, the first signaling is correlated to a first synchronization sequence, the first signaling is used for determining at least one of {first signature sequence, second synchronization sequence}, and the first signature sequence is used for generating the first radio signal; the receiving timing of the second radio signal is used for determining the transmitting timing of the first radio signal; the second radio signal is associated with the second synchronization sequence, the first synchronization sequence differs from the second synchronization sequence; the first operation is transmitting, or the first operation is receiving; and a transmitter of the first signaling corresponds to a first node, and a transmitter of the second radio signal corresponds to a second node.

In one embodiment, the above UE used for wireless communication is characterized in that the first processing module is configured to transmit second information. The first information is used for determining the second information. The second information is used for determining the first signaling. The first operation is transmitting.

In one embodiment, the above UE used for wireless communication is characterized in that the first processing module is configured to hand over from a first cell to a second cell. The first cell refers to the first node. The second cell refers to the second node.

In one embodiment, the above UE used for wireless communication is characterized in that the second processing module is configured to process the first information by a first execution. At least one of {channel measurement for third link, channel measurement for fourth link} is used for determining the first information. A radio channel from the first node to a transmitter of the first information corresponds to the third link, and a radio channel from the second node to the transmitter of the first information corresponds to the fourth link. The first operation is transmitting and the first execution is receiving, or the first operation is receiving and the first execution is transmitting.

In one embodiment, the above UE used for wireless communication is characterized in that the second processing module processes a second signaling by a first operation. The second signaling is used for triggering the transmission of the first information. At least one of {channel measurement for first link, channel measurement for second link} is used for determining the second signaling. A radio channel from the first node to the transmitter of the first radio signal corresponds to the first link, and a radio channel from the second node to the transmitter of the first radio signal corresponds to the second link. The first execution is receiving and the first operation is transmitting, or the first execution is transmitting and the first operation is receiving.

In one embodiment, the above UE used for wireless communication is characterized in that the second processing module is configured to process a third radio signal by a first operation. The first cell refers to the first node, and the second cell refers to the second node. The receiving timing for the second cell is used for determining the transmitting timing of the third radio signal. The first operation is transmitting and the first execution is receiving, or the first operation is receiving and the first execution is transmitting.

In one embodiment, the above UE used for wireless communication is characterized in that the first node and the second node are non-co-sited.

The present disclosure discloses a base station device used for wireless communication. The base station device includes:

a third processing module, to transmit a first signaling, or to transmit a second radio signal.

Herein, the first signaling is correlated to a first synchronization sequence, the first signaling is used for determining at least one of {first signature sequence, second synchronization sequence}, and the first signature sequence is used for generating a first radio signal; the receiving timing of the second radio signal is used for determining the transmitting timing of the first radio signal; the second radio signal is associated with the second synchronization sequence; and the first synchronization sequence differs from the second synchronization sequence.

In one embodiment, the above base station device used for wireless communication is characterized in that the third processing module transmits the first signaling and the third processing module receives the second information. The first information is used for determining the second information. The second information is used for determining the first signaling. At least one of {channel measurement for third link, channel measurement for fourth link} is used for determining the first information. A radio channel from the transmitter of the first signaling to the transmitter of the first information corresponds to the third link, and a radio channel from the transmitter of the second radio signal to the transmitter of the first information corresponds to the fourth link.

In one embodiment, the above base station device used for wireless communication is characterized in that the third processing module transmits the first signaling and the third processing module detaches a first terminal and a second terminal from a first cell. The first cell refers to a serving cell corresponding to the transmitter of the first signaling. The first terminal is the transmitter of the first radio signal, and the second terminal is the transmitter of the first information.

In one embodiment, the above base station device used for wireless communication is characterized in that the third processing module transmits the second radio signal and the third processing module establishes two connections for the first terminal and the second terminal respectively in the second cell. The second cell refers to a serving cell corresponding to the transmitter of the second radio signal. The first terminal is the transmitter of the first radio signal, and the second terminal is the transmitter of the first information.

In one embodiment, the above base station device used for wireless communication further includes:

a fourth processing module, to process third information by a second operation and process fourth information by a second execution.

Herein, the second information is used for determining the third information; the third information is transmitted on a backhaul link; the third information is used for determining that at least the former one of {the transmitter of the first radio signal, the transmitter of the first information} initiates a handover request; the fourth information is used for acknowledging that the third information is correctly received; the fourth information is used for determining at least the first signature sequence; the fourth information is transmitted on the backhaul link; the third processing module transmits the first signaling, the second operation is transmitting, and the second execution is receiving; or the third processing module transmits the second radio signal, the second operation is receiving and the second execution is transmitting.

In one embodiment, the above base station device used for wireless communication is characterized in that the second signaling is used for triggering the transmission of the first information. At least one of {channel measurement for first link, channel measurement for second link} is used for determining the second signaling. A radio channel from the transmitter of the first signaling to the transmitter of the first radio signal corresponds to the first link, and a radio channel from the transmitter of the second radio signal to the transmitter of the first radio signal corresponds to the second link.

In one embodiment, the above base station device used for wireless communication is characterized in that the transmitter of the first signaling and the transmitter of the second radio signal are non-co-sited.

In one embodiment, compared with the existing technologies, the present disclosure has the following beneficial effects.

The first signaling is designed for configuring resources occupied by the D2D transmission after the UE initiates handover, and the resources are configured by a target cell for the handover of the UE. Thus, interruption of D2D transmission is avoided during the handover process of UE, and interference caused by the D2D transmission of UE to the uplink transmission in the target cell is avoided too.

The target cell transmits the second radio signal, and the D2D transmission during the handover process of UE synchronizes with the target cell. Thus, interference to the uplink data of the target cell is further avoided.

When a D2D pair initiates handover, the channel measurement results of the serving cell and the neighbor cell for each UE in the D2D pair need to be considered. Handover is performed only when both the ground terminal and the aerial vehicle meet the conditions of handover. Thus the stability and efficiency of handover are improved. Moreover, taking the fast movement speed of the aerial vehicle and the LOS into account, the handover of the aerial vehicle follows the handover of the ground terminal, to avoid the risk of frequent handover.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the disclosure and the characteristics of the embodiments may be arbitrarily combined if there is no conflict.

Embodiment 1

Figure 1:
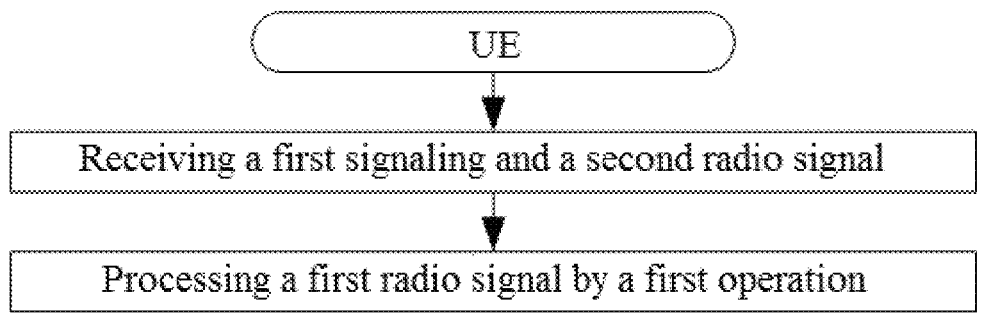
FIG. 1 is a flowchart illustrating a first signaling according to one embodiment of the present disclosure.

Embodiment 1 illustrates an example of a flowchart for a first signaling, as shown in FIG. 1.

In Embodiment 1, the UE in the present disclosure preferentially receives a first signaling and a second radio signal, and subsequently processes a first radio signal by a first operation. The first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence. The first operation is transmitting, or the first operation is receiving. A transmitter of the first signaling corresponds to a first node, and a transmitter of the second radio signal corresponds to a second node.

In one embodiment, the first radio signal is transmitted on a first time-frequency resource set, and the first signaling is used for determining the first time-frequency resource set.

In one subembodiment, the first signaling explicitly indicates the first time-frequency resource set.

In one embodiment, the first node is a base station.

In one embodiment, the first node is a serving cell corresponding to the UE.

In one embodiment, the second node is a base station.

In one embodiment, the second node is a neighbor cell of the serving cell corresponding to the UE.

In one embodiment, the first radio signal is transmitted on a PC5 link.

In one embodiment, the first synchronization sequence corresponds to a first identity and the second synchronization sequence corresponds to a second identity. The first identity differs from the second identity.

In one subembodiment, the first identity is a PCI.

In one subembodiment, the second identity is a PCI.

In one embodiment, the given synchronization sequence includes at least one of {PSS, SSS}. The given synchronization sequence one is one of {first synchronization sequence, second synchronization sequence}.

In one embodiment, the second radio signal includes at least one of {PSS, SSS}.

In one embodiment, the first signaling indicates a first feature identity, and the first feature identity is used for generating the first signature sequence.

In one subembodiment, the first feature identity is an SLSSID.

In one subembodiment, the first feature identity is an integer not smaller than 0 and not greater than 167.

In one subembodiment, the first signaling includes part or all fields of an SL-SyncConfig IE in TS 36.331.

In one subembodiment, the act that the first feature identity is used for generating the first signature sequence refers that the first feature identity is used for initializing a generator of the first signature sequence.

In one dependent embodiment, the first radio signal includes a PSSS, the first feature identity corresponds to $N_{ID}^{SL}$ in TS 36211, and the first signature sequence corresponds to $d_i(n)$ in Section 9.7.1 in TS 36.211.

In one dependent embodiment, the first radio signal includes an SSSS, the first feature identity corresponds to $N_{ID}^{SL}$ in TS 36.211, and the first signature sequence corresponds to $d_i(n)$ in Section 9.7.2 in TS 36.211.

In one embodiment, the first signaling is a physical layer signaling.

In one subembodiment, the physical layer signaling is a DCI.

In one embodiment, the first signaling is a high layer signaling.

In one subembodiment, the high layer signaling is an RRC signaling.

In one dependent embodiment, the RRC signaling is UE specific.

In one embodiment, the first operation is transmitting, and the UE is an opposite-paired UE of a ground terminal.

In one subembodiment, the opposite-paired UE is a ground terminal.

In one subembodiment, the opposite-paired UE is a terminal used for terrestrial radio access.

In one embodiment, the first operation is transmitting, and the UE is an opposite-paired UE of an aerial vehicle.

In one subembodiment, the opposite-paired UE is a ground terminal.

In one subembodiment, the opposite-paired UE is a terminal used for terrestrial radio access.

In one embodiment, the first operation is receiving, and the UE is an aerial vehicle.

In one embodiment, the first operation is receiving, and the UE is a ground terminal.

In one embodiment, the given synchronization sequence is generated after passing through {Resource Element Mapper, OFDM Symbol Generator} in sequence. The given synchronization sequence is the first synchronization sequence, or the given synchronization sequence is the second synchronization sequence.

In one embodiment, the given synchronization sequence is generated after passing through {Precoding, Resource Element Mapper, OFDM Symbol Generator} in sequence. The given synchronization sequence is the first synchronization sequence, or the given synchronization sequence is the second synchronization sequence.

In one embodiment, the cell in the present disclosure corresponds to a cell in LTE.

In one embodiment, the cell in the present disclosure corresponds to a cell in 5G.

In one embodiment, the cell in the present disclosure corresponds to a base station in 5G.

In one embodiment, the cell in the present disclosure corresponds to a TRP in 5G.

In one embodiment, the node in the present disclosure corresponds to a cell in LTE.

In one embodiment, the node in the present disclosure corresponds to cell in 5G.

In one embodiment, the node in the present disclosure corresponds to a base station in 5G.

In one embodiment, the node in the present disclosure corresponds to a TRP in 5G.

In one embodiment, the act that the receiving timing of the second radio signal is used for determining the transmitting timing of the first radio signal refers that the UE selects the transmitter of the second radio signal as a synchronization reference source.

In one embodiment, the act that the receiving timing of the second radio signal is used for determining the transmitting timing of the first radio signal refers that the UE selects the transmitter of the second radio signal as a synchronization reference source and selects the second radio signal as a timing reference of the first radio signal.

Embodiment 2

Figure 2:
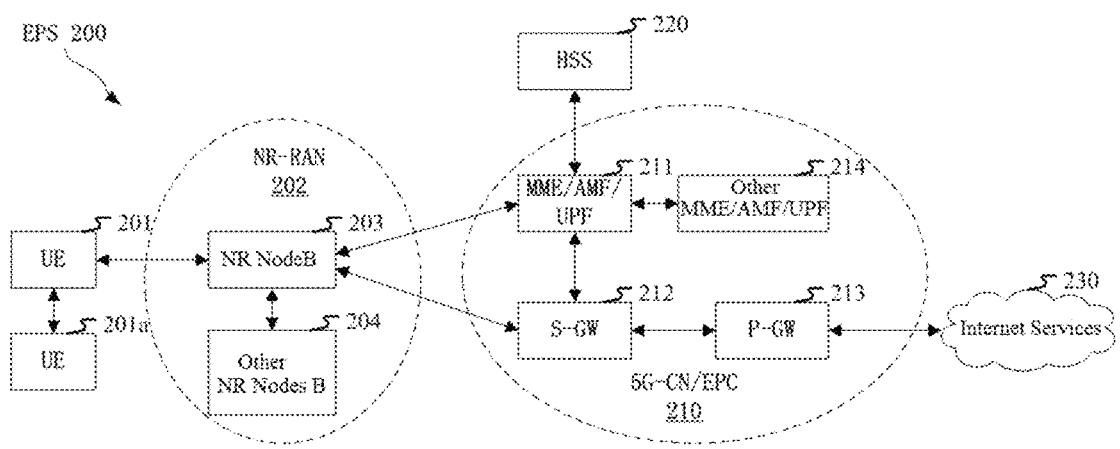
FIG. 2 is a diagram illustrating a network architecture according to one embodiment of the present disclosure.

Embodiment 2 illustrates an example of a diagram for a network architecture, as shown in FIG. 2.

Embodiment 2 illustrates an example of a diagram for a network architecture according to the present disclosure, as shown in FIG. 2. FIG. 2 is a diagram illustrating a system network architecture 200 of NR 5G, LTE and Long-Term Evolution Advanced (LTE-A). The NR 5G or LTE network architecture 200 may be called an Evolved Packet System (EPS) 200 or other appropriate terms. The EPS 200 may include one or more UEs 201, a Next Generation-Radio Access Network (NG-RAN) 202, a 5G-Core Network (5G-CN)/Evolved Packet Core (EPC) 210, a Home Subscriber Server (HSS) 220 and an Internet Service 230. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the 5G-CN/EPC 210 for the UE 201 and UE 201a. Examples of UE 201 and UE 201a include cellular phones, smart phones, Session Initiation Protocol (SIP) phones, laptop computers, Personal Digital Assistants (PDAs), Satellite Radios, non-ground base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or other appropriate terms. The gNB 203 is connected to the 5G-CN/EPC 210 via an S1/NG interface. The 5G-CN/EPC 210 includes a Mobility Management Entity (MME)/Authentication Management Field (AMF)/User Plane Function (UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 itself is connected to the P-GW 213. The P-GW 213 provides UE IP address allocation and other functions. The P-GW 213 is connected to the internet service 230. The internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the present disclosure.

In one subembodiment, the UE 201a corresponds to the UE in the present disclosure.

In one subembodiment, the UE 201 is ground terminal equipment.

In one subembodiment, the UE 201 is aerial vehicle equipment

Embodiment 3

Figure 3:
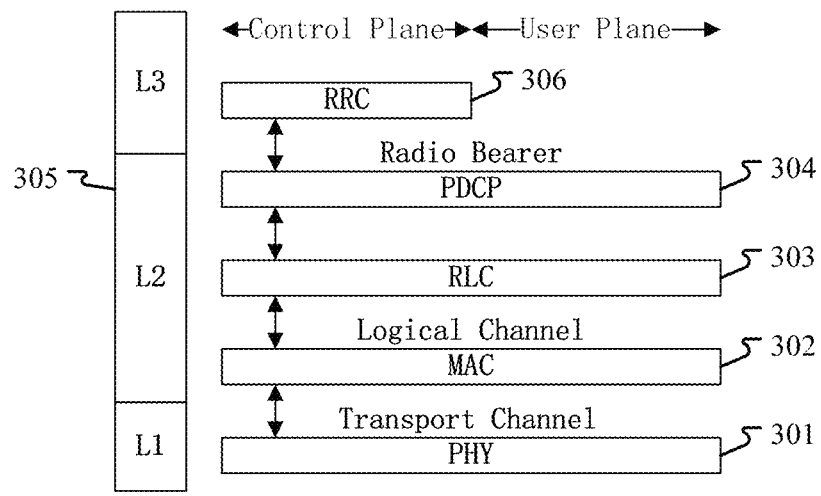
FIG. 3 is a diagram illustrating an embodiment of a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a base station device (gNB or eNB) is presented by three layers, which are a layer 1, a layer 2 and a layer 3 respectively. The layer 1 (L1) 301 is the lowest layer and performs signal processing functions of a PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers end at the gNB of the network side. Although not described in FIG. 3, the UE may include several higher layers above the L2 305, such as network layer (i.e. IP layer) ending at a P-GW of the network side and an disclosure layer ending at the other side of the connection (i.e. a peer UE, a server, etc.). The PDCP sublayer 304 provides multiplexing among variable radio bearers and logical channels. The PDCP sublayer 304 also provides a header compression for a higher layer packet so as to reduce a radio transmission overhead. The PDCP sublayer 304 provides security by encrypting a packet and provides support for UE handover between gNBs. The RLC sublayer 303 provides segmentation and reassembling of a higher layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using a RRC signaling between the gNB and the UE.

In one subembodiment, the radio protocol architecture shown in FIG. 3 is applicable to the UE in the present disclosure.

In one subembodiment, the radio protocol architecture shown in FIG. 3 is applicable to the base station in the present disclosure.

In one subembodiment, the first signaling in the present disclosure is generated by the PHY 301.

In one subembodiment, the second signaling in the present disclosure is generated by the PHY 301.

In one subembodiment, the first information in the present disclosure is generated by the RRC sublayer 306.

In one subembodiment, the second information in the present disclosure is generated by the RRC sublayer 306.

Embodiment 4

Figure 4:
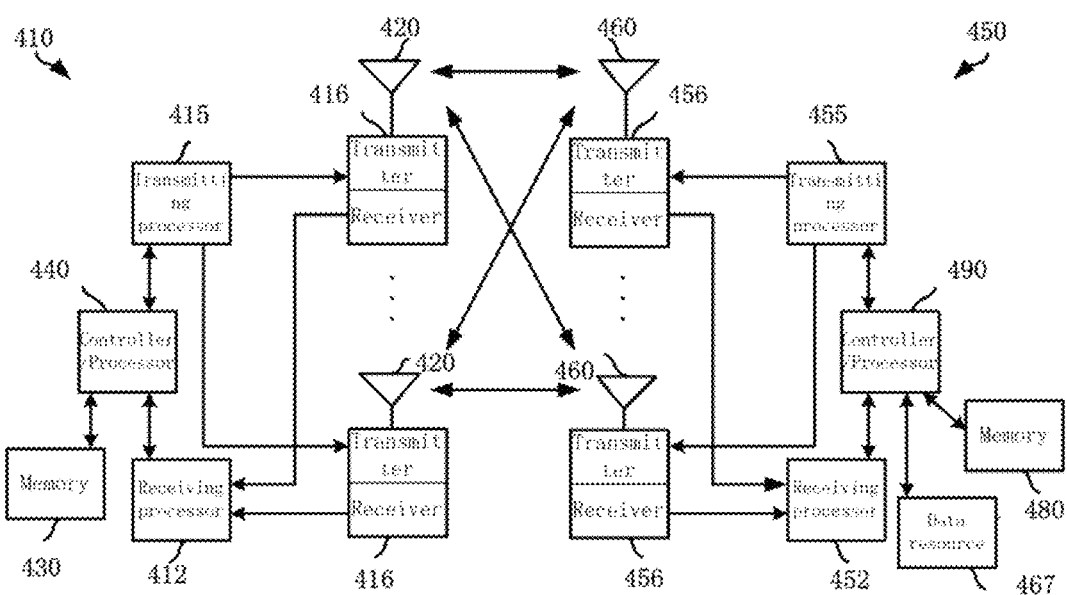
FIG. 4 is a diagram illustrating an evolved node B and a UE according to one embodiment of the present disclosure.

Embodiment 4 illustrates a base station device and a UE according to the present disclosure, as shown in FIG. 4. FIG. 4 is a block diagram of a gNB 410 in communication with a UE 450 in an access network.

The base station device 410 includes a controller/processor 440, a memory 430, a receiving processor 412, a transmitting processor 415, a transmitter/receiver 416 and antenna(s) 420.

The UE 450 includes a controller/processor 490, a memory 480, a data source 467, a transmitting processor 455, a receiving processor 452, a transmitter/receiver 456 and antenna(s) 460.

In uplink transmission, processes relevant to the base station device 410 include the following.

The receiver 416 receives a radio-frequency signal through the corresponding antenna 420, converts the received radio-frequency signal into a baseband signal, and provides the baseband signal to the receiving processor 412.

The receiving processor 412 performs signal receiving processing functions of an L1 layer (that is, PHY), such as decoding, de-interleaving, descrambling, demodulation, extraction of Physical layer control signaling, etc.

The receiving processor 412 performs signal receiving processing functions of an L1 layer (that is, PHY), including multi-antenna receiving, dispreading, code division multi-plexing, precoding, etc.

The controller/processor 440 performs operations of an L2 layer, and is connected to the memory 43 that stores program code and data.

The controller/processor 440 provides multiplexing between a transport channel and a logical channel, packet reassembling, decryption, header decompression, and control signaling processing so as to recover a higher-layer packet coming from the UE 450. The higher-layer packet from the controller/processor 440 is then provided to a core network.

In UL transmission, processes relevant to the UE 450 include the following.

The data source 467 provides a higher-layer packet to the controller/processor 490. The data source 467 expresses all protocol layers above the L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs signal receiving processing functions of the L1 layer (that is, PHY), including encoding, interleaving, scrambling, modulation, generation of PHY signaling, etc.

The transmitting processor 455 performs signal receiving processing functions of the L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of the layer 2 of the user plane and the control plane.

The controller/processor 490 is in charge of HARQ operation, retransmission of a lost packet, and the signaling to the eNB 410.

In Downlink (DL) transmission, processes relevant to the base station device 410 include the following.

A packet from a higher layer is provided to a controller/processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 is connected to a memory 430 that stores program code and data. The memory 430 is computer readable.

The controller/processor 440 includes a scheduling unit used for transmission requirements. The scheduling unit is configured to schedule aerial resources corresponding to transmission requirements.

The transmitting processor 415 receives a bit stream output from the controller/processor 440, and performs signal transmitting processing functions of an L1 layer (that is, PHY), including encoding, interleaving, scrambling, modulation, power control/allocation, generation of Physical layer control signaling (including PBCH, PDCCH, PHICH, PCFICH, reference signal), etc.

The transmitting processor 415 receives a bit stream output from the controller/processor 440, and performs signal transmitting processing functions of an L1 layer (that is, PHY), including multi-antenna transmitting, spreading, code division multiplexing, precoding, etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including decoding, de-interleaving, descrambling, demodulation, extraction of Physical layer control signaling, etc.

The receiving processor 452 performs signal receiving processing functions of an L1 layer (that is, PHY), including multi-antenna receiving, despreading, code division multiplexing, precoding, etc.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 is connected to a memory 480 that stores program code and data. The memory 480 is computer readable.

In one subembodiment, the UE 450 device includes at least one processor and at least one memory. The at least one memory includes computer program codes. The at least one memory and the computer program codes are configured to be used in collaboration with the at least one processor. The UE 450 device at least receives a first signaling and a second radio signal, and processes a first radio signal by a first operation. The first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence. The first operation is transmitting, or the first operation is receiving. A transmitter of the first signaling corresponds to a first node, and a transmitter of the second radio signal corresponds to a second node.

In one subembodiment, the UE 450 includes a memory that stores a computer readable instruction program. The computer readable instruction program generates an action when executed by at least one processor. The action includes receiving a first signaling and a second radio signal, and processing a first radio signal by a first operation. The first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence. The first operation is transmitting, or the first operation is receiving. A transmitter of the first signaling corresponds to a first node, and a transmitter of the second radio signal corresponds to a second node.

In one subembodiment, the gNB 410 device includes at least one processor and at least one memory. The at least one memory includes computer program codes. The at least one memory and the computer program codes are configured to be used in collaboration with the at least one processor. The gNB 410 device at least transmits a first signaling, or transmits a second radio signal. The first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence.

In one subembodiment, the gNB 410 includes a memory that stores a computer readable instruction program. The computer readable instruction program generates an action when executed by at least one processor. The action includes transmitting a first signaling or transmitting a second radio signal. The first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence.

In one subembodiment, the UE 450 corresponds to the UE in the present disclosure.

In one subembodiment, the gNB 410 corresponds to the base station in the present disclosure.

In one subembodiment, at least the former two of the receiver 456, the receiving processor 452, and the controller/processor 490 are configured to receive a first signaling and a second radio signal.

In one subembodiment, at least the former two of the receiver 456, the receiving processor 452, and the controller/processor 490 are configured to receive a first radio signal.

In one subembodiment, at least the former two of the transmitter 456, the transmitting processor 455, and the controller/processor 490 are configured to transmit a first radio signal.

In one subembodiment, at least the former two of the receiver 456, the receiving processor 452, and the controller/processor 490 are configured to receive first information.

In one subembodiment, at least the former two of the transmitter 456, the transmitting processor 455, and the controller/processor 490 are configured to transmit first information.

In one subembodiment, at least the former two of the receiver 456, the receiving processor 452, and the controller/processor 490 are configured to receive a second signaling.

In one subembodiment, at least the former two of the transmitter 456, the transmitting processor 455, and the controller/processor 490 are configured to transmit a second signaling.

In one subembodiment, at least the former two of the transmitter 456, the transmitting processor 455, and the controller/processor 490 are configured to transmit second information.

In one subembodiment, at least the former two of the receiver 456, the receiving processor 452, and the controller/processor 490 are configured to receive a third radio signal.

In one subembodiment, at least the former two of the transmitter 456, the transmitting processor 455, and the controller/processor 490 are configured to transmit a third radio signal.

In one subembodiment, at least the former two of the transmitter 416, the transmitting processor 415, and the controller/processor 440 are configured to transmit a first signaling.

In one subembodiment, at least the former two of the transmitter 416, the transmitting processor 415, and the controller/processor 440 are configured to transmit a first radio signal.

In one subembodiment, at least the former two of the receiver 416, the receiving processor 412, and the controller/processor 440 are configured to receive second information.

In one subembodiment, at least the former two of the transmitter 416, the transmitting processor 415, and the controller/processor 440 are configured to transmit third information.

In one subembodiment, at least the former two of the receiver 416, the receiving processor 412, and the controller/processor 440 are configured to receive third information.

In one subembodiment, at least the former two of the transmitter 416, the transmitting processor 415, and the controller/processor 440 are configured to transmit fourth information.

In one subembodiment, at least the former two of the receiver 416, the receiving processor 412, and the controller/processor 440 are configured to receive fourth information.

Embodiment 5

Figure 5:
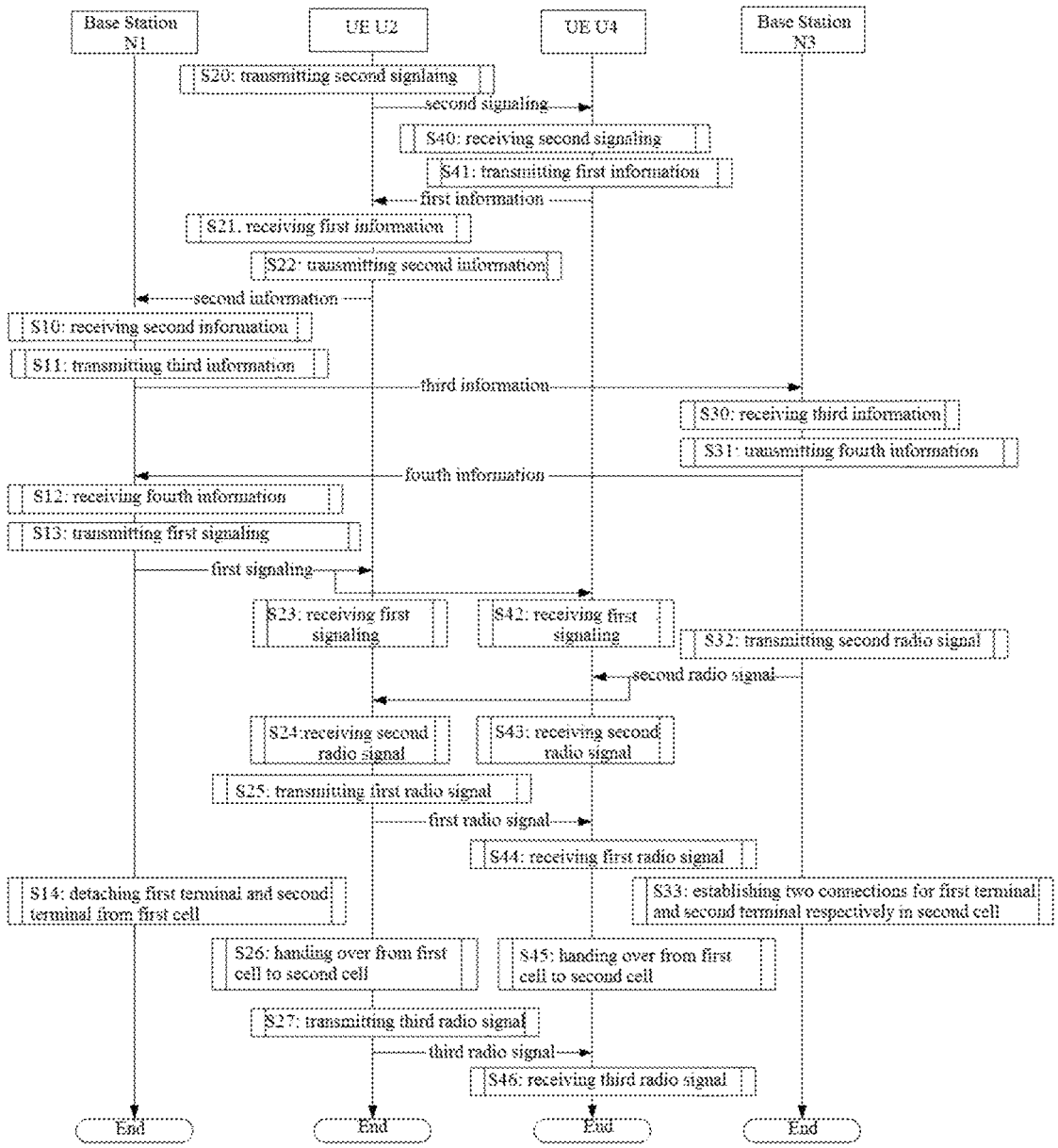
FIG. 5 is a flowchart illustrating the transmission of a first radio signal according to one embodiment of the present disclosure.

Embodiment 5 illustrates an example of a flowchart for the transmission of a first radio signal according to the present disclosure, as shown in FIG. 5. In FIG. 5, the base station N1 is a maintenance base station for a serving cell of the UE U2, the base station N3 is a maintenance base station for a neighbor cell of the base station N1, the neighbor cell being a corresponding target cell for the handover initiated by the UE U2, and the UE U4 is an opposite-paired UE of the UE U2.

The base station N1 receives second information in S10, transmits third information in S11, receives fourth information in S12, transmits a first signaling in S13, and detaches a first terminal and a second terminal from a first cell in S14.

The UE U2 transmits a second signaling in S20, receives first information in S21, transmits the second information in S22, receives the first signaling in S23, receives a second radio signal in S24, transmits a first radio signal in S25, hands over from the first cell to a second cell in S26, and transmits a third radio signal in S27.

The base station N3 receives the third information in S30, transmits the fourth information in S31, transmits the second radio signal in S32, and establishes two connections for the first terminal and the second terminal respectively in the second cell in S33.

The UE U4 receives the second signaling in S40, transmits the first information in S41, receives the first signaling in S42, receives the second radio signal in S43, receives the first radio signal in S44, hands over from the first cell to the second cell in S45, and receives the third radio signal in S46.

In embodiment 5, the first signaling is correlated to a first synchronization sequence. The first signaling is used for determining at least one of {first signature sequence, second synchronization sequence}. The first signature sequence is used for generating the first radio signal. The receiving timing of the second radio signal is used for determining the transmitting timing of the first radio signal. The second radio signal is associated with the second synchronization sequence. The first synchronization sequence differs from the second synchronization sequence. The base station N1 corresponds to a first node, and the base station N2 corresponds to a second node. At least one of {channel measurement for third link, channel measurement for fourth link} is used for determining the first information. A radio channel from the first node to the UE U4 corresponds to the third link, and a radio channel from the second node to UE U4 corresponds to the fourth link. The second signaling is used for triggering the transmission of the first information. At least one of {channel measurement for first link, channel measurement for second link} is used for determining the second signaling. A radio channel from the first node to the UE U2 corresponds to the first link, and a radio channel from the second node to the UE U2 corresponds to the second link. The first information is used for determining the second information. The second information is used for determining the first signaling. The first node and the second node are non-co-sited. The first cell refers to the first node, and the second cell refers to the second node. The receiving timing for the second cell is used for determining the transmitting timing of the third radio signal.

In one subembodiment, the first radio signal includes at least one of {PSSS, SSSS}

In one subembodiment, a physical layer channel corresponding to the first radio signal is one of {PSSCH, PSCCH, PSDCH, PSBCH}.

In one subembodiment, a physical layer channel corresponding to the second information is one of {Physical Uplink Control Channel (PUCCH), New Radio PUCCH (N—PUCCH)}.

In one subembodiment, a physical layer channel corresponding to the second information is one of {Physical Uplink Shared Channel (PUSCH), New Radio PUSCH (N-PUSCH)}.

In one subembodiment, a transmission channel corresponding to the second information is Uplink Share Channel (UL-SCH).

Embodiment 6

Figure 6:
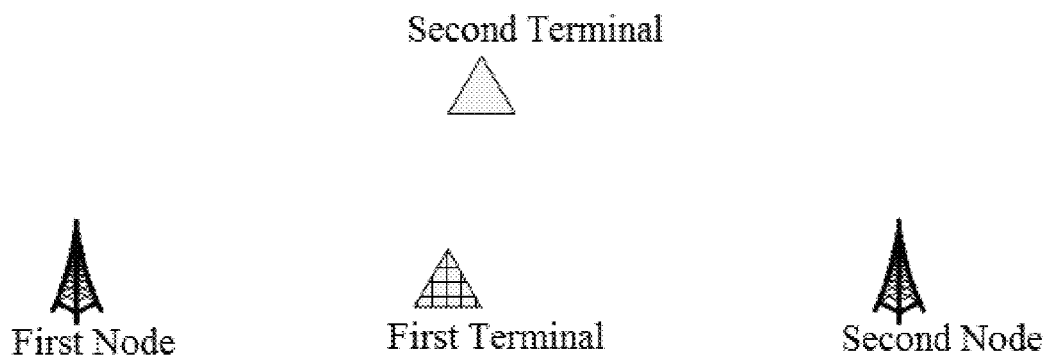
FIG. 6 is a diagram illustrating an disclosure scene according to one embodiment of the present disclosure.

Embodiment 6 illustrates an example of a diagram for an disclosure scene according to the present disclosure, as shown in FIG. 6. In FIG. 6, the first terminal corresponds to the transmitter of the first radio signal in the present disclosure, the second terminal corresponds to the transmitter of the first information in the present disclosure, the first node corresponds to the transmitter of the first signaling in the present disclosure, and the second node corresponds to the transmitter of the second radio signal in the present disclosure.

In one subembodiment, the first terminal and the second terminal perform D2D communications.

In one subembodiment, the first terminal is a ground terminal, and the second terminal is an aerial vehicle.

In one subembodiment, the first terminal is an aerial vehicle, and the second terminal is a ground terminal.

In one subembodiment, both the first terminal and the second terminal are ground terminals.

In one subembodiment, both the first terminal and the second terminal are aerial vehicles.

In one subembodiment, the first node is a serving cell of the first terminal.

In one subembodiment, the first node is a serving cell of the second terminal.

In one subembodiment, the second node is a neighbor cell of the first node.

In one subembodiment, the first terminal initiates a handover request to the first node, where the target cell of the handover requestis the second node.

In one subembodiment, the present disclosure illustrates a scenario of the first terminal moving to the second node.

In one subembodiment, the present disclosure illustrates a scenario of the second terminal moving to the second node.

Embodiment 7

Figure 7:
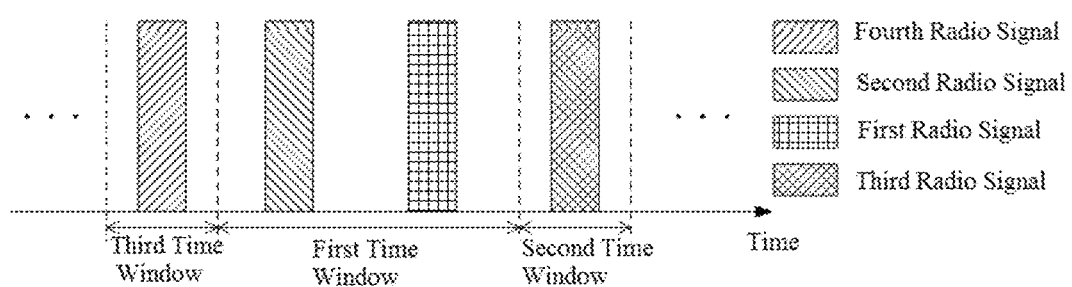
FIG. 7 is a diagram illustrating a time sequence of a first radio signal, a second radio signal and a third radio signal according to one embodiment of the present disclosure.

Embodiment 7 illustrates an example of a diagram for a time sequence of a first radio signal, a second radio signal and a third radio signal, as shown in FIG. 7. In FIG. 7, the first radio signal and the second radio are transmitted in the first time window, and the third radio signal is transmitted in the second time window. The UE in the present disclosure processes the fourth radio signal by a first operation in the third time window. The first operation is transmitting or the first operation is receiving.

In one subembodiment, the second signature sequence is used for generating the fourth radio signal, and the first signature sequence is used for generating the first radio signal. The second signature sequence differs from the first signature sequence.

In one subembodiment, the first signature sequence is used for generating the first radio signal, and the first signature sequence is also used for generating the third radio signal.

In one subembodiment, the receiving timing of the second radio signal in the present disclosure is used for determining the transmitting timing of the first radio signal, and the receiving timing of the given radio signal is used for determining the transmitting timing of the fourth radio signal. The transmitter of the given radio signal is a transmitter other than the transmitter of the second radio signal.

In one dependent embodiment, the transmitter of the given radio signal is a serving cell of the transmitter of the first radio signal in the third time window.

In one dependent embodiment, the transmitter of the first radio signal initiates a handover to the cell corresponding to the transmitter of the second radio signal in the first time window.

In one dependent embodiment, the transmitter of the second radio signal is a serving cell of the transmitter of the first radio signal in the second time window.

In one dependent embodiment, the act that the receiving timing of the given radio signal is used for determining the transmitting timing of the fourth radio signal refers that the transmitter of the fourth radio signal selects the transmitter of the given radio signal as a synchronization reference source.

In one dependent embodiment, the act that the receiving timing of the given radio signal is used for determining the transmitting timing of the fourth radio signal refers that the transmitter of the fourth radio signal selects the transmitter of the given radio signal as a synchronization reference source and selects the given radio signal as a timing reference of the fourth radio signal.

In one subembodiment, the transmitting timing of the second radio signal in the present disclosure is used for determining the receiving timing of the third radio signal.

Embodiment 8

Figure 8:
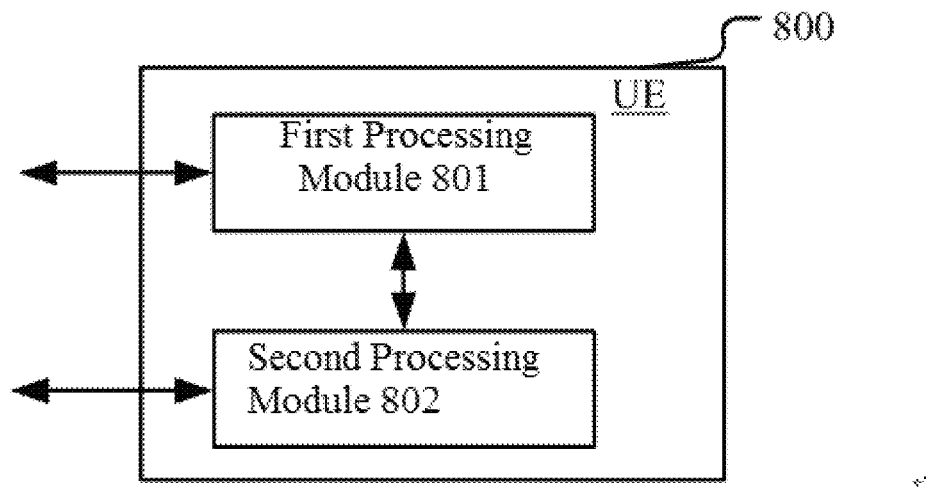
FIG. 8 is a structure block diagram illustrating a processing device in a UE according to one embodiment of the present disclosure.

Embodiment 8 illustrates an example of a structure block diagram for a processing device in a UE, as shown in FIG. 8. In FIG. 8, a UE processing device 800 is mainly composed of a first processing module 801 and a second processing module 802.

The first processing module 801, to receive a first signaling and a second radio signal.

The second processing module 802, to process a first radio signal by a first operation.

In embodiment 8, the first signaling is correlated to a first synchronization sequence, the first signaling is used for determining at least one of {first signature sequence, second synchronization sequence}, and the first signature sequence is used for generating the first radio signal. The receiving timing of the second radio signal is used for determining the transmitting timing of the first radio signal. The second radio signal is associated with the second synchronization sequence, and the first synchronization sequence differs from the second synchronization sequence. The first operation is transmitting, or the first operation is receiving. A transmitter of the first signaling corresponds to a first node, and a transmitter of the second radio signal corresponds to a second node.

In one subembodiment, the first processing module 801 transmits second information; the first information is used for determining the second information; and the second information is used for determining the first signaling. The first operation is transmitting.

In one subembodiment, the first processing module 801 hands over to a second cell from a first cell. The first cell refers to the first node, and the second cell refers to the second node.

In one subembodiment, the second processing module 802 processes the first information by a first execution. At least one of {channel measurement for third link, channel measurement for fourth link} is used for determining the first information. A radio channel from the first node to the transmitter of the first information corresponds to the third link, and a radio channel from the second node to the transmitter of the first information corresponds to the fourth link. The first operation is transmitting and the first execution is receiving, or the first operation is receiving and the first execution is transmitting.

In one subembodiment, the second processing module 802 processes a second signaling by a first operation. The second signaling is used for triggering the transmission of the first information. At least one of {channel measurement for first link, channel measurement for second link} is used for determining the second signaling. A radio channel from the first node to the transmitter of the first radio signal corresponds to the first link, and a radio channel from the second node to the transmitter of the first radio signal corresponds to the second link. The first execution is receiving and the first operation is transmitting, or the first execution is transmitting and the first operation is receiving.

In one subembodiment, the second processing module 802 processes a third radio signal by a first operation. The first cell refers to the first node, and the second cell refers to the second node. The receiving timing for the second cell is used for determining the transmitting timing of the third radio signal. The first operation is transmitting and the first execution is receiving, or the first operation is receiving and the first execution is transmitting.

In one subembodiment, the first node and the second node are non-co-sited.

In one subembodiment, the first processing module 801 includes at least the former four of the transmitter/receiver 456, the transmitting processor 455, the receiving processor 452, and the controller/processor 490 referred in Embodiment 4.

In one subembodiment, the second processing module 802 includes at least the former four of the transmitter/

25 receiver 456, the transmitting processor 455, the receiving processor 452, and the controller/processor 490 referred in Embodiment 4.

Embodiment 9

Figure 9:
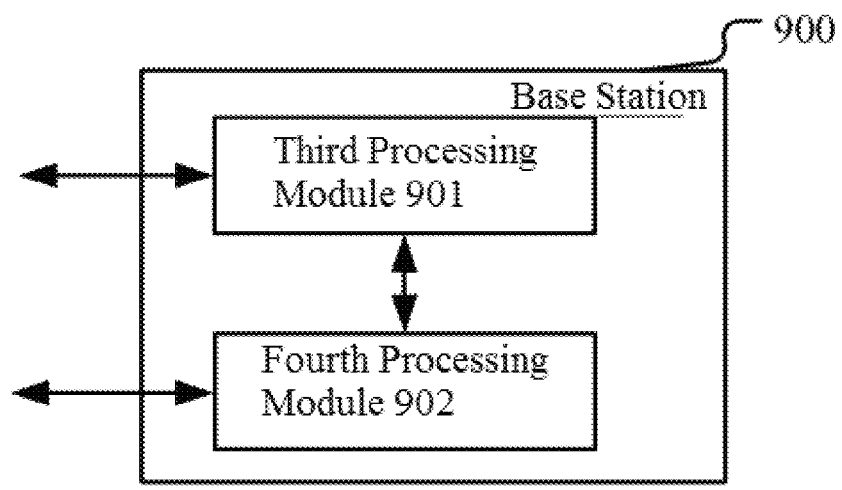
FIG. 9 is a structure block diagram illustrating a processing device in a base station according to one embodiment of the present disclosure.

Embodiment 9 illustrates an example of a structure block diagram for a processing device in a base station, as shown in FIG. 9. In FIG. 9, a processing device 900 for a base station is mainly composed of a third processing module 901 and a fourth processing module 902.

The third processing module 901, to transmit a first signaling, or transmit a second radio signal.

The fourth processing module 902, to process third information by a second operation and process fourth information by a second execution.

In embodiment 9, the first signaling is correlated to a first synchronization sequence, the first signaling is used for determining at least one of {first signature sequence, second synchronization sequence}, and the first signature sequence is used for generating the first radio signal. The receiving timing of the second radio signal is used for determining the transmitting timing of the first radio signal. The second radio signal is associated with the second synchronization sequence, and the first synchronization sequence differs from the second synchronization sequence. The second information is used for determining the third information. The third information is transmitted on the backhaul link, and the third information is used for determining that at least the former one of {the transmitter of the first radio signal, the transmitter of the first information} initiates a handover request. The fourth information is used for acknowledging that the third information is correctly received. The fourth information is used for determining at least the first signature sequence; and the fourth information is transmitted on the backhaul link. The third processing module is configured to transmit the first signaling; the second operation is transmitting; and the second execution is receiving. Or the third processing module is configured to transmit the second radio signal; the second operation is receiving; and the second execution is transmitting.

In one subembodiment, the third processing module 901 transmits the first signaling and the third processing module 901 receives the second information. The first information is used for determining the second information. The second information is used for determining the first signaling. At least one of {channel measurement for third link, channel measurement for fourth link} is used for determining the first information. A radio channel from the transmitter of the first signaling to the transmitter of the first information corresponds to the third link, and a radio channel from the transmitter of the second radio signal to the transmitter of the first information corresponds to the fourth link.

In one subembodiment, the third processing module 901 transmits the first signaling and the third processing module 901 detaches a first terminal and a second terminal from a first cell. The first cell refers to a serving cell corresponding to the transmitter of the first signaling. The first terminal is the transmitter of the first radio signal, and the second terminal is the transmitter of the first information.

In one subembodiment, the third processing module 901 transmits the second radio signal and the third processing module 901 establishes two connections for the first terminal and the second terminal respectively in the second cell. The second cell refers to a serving cell corresponding to the transmitter of the second radio signal. The first terminal is

26 the transmitter of the first radio signal, and the second terminal is the transmitter of the first information.

In one subembodiment, the second signaling is used for triggering the transmission of the first information. At least one of {channel measurement for first link, channel measurement for second link} is used for determining the second signaling. A radio channel from the transmitter of the first signaling to the transmitter of the first radio signal corresponds to the first link, and a radio channel from the transmitter of the second radio signal to the transmitter of the first radio signal corresponds to the second link.

In one subembodiment, the transmitter of the first signaling and the transmitter of the second radio signal are non-co-sited.

In one subembodiment, the third processing module 901 includes at least the former four of the receiver/transmitter 416, the transmitting processor 415, the receiving processor 412, and the controller/processor 440 referred in Embodiment 4.

In one subembodiment, the fourth processing module 902 includes at least the former four of the receiver/transmitter 416, the transmitting processor 415, the receiving processor 412, and the controller/processor 440 referred in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present disclosure includes but not limited to macro-cellular base stations, micro-cellular base stations, home base stations, relay base station and radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a first signaling and a second radio signal; and
   transmitting a first radio signal;
   wherein:
   the first signaling is correlated to a first synchronization sequence, the first signaling indicates a first feature identity and a second identity, and a first signature sequence is used for generating the first radio signal, a second synchronization sequence corresponds to the second identity; the first synchronization sequence corresponds to a first identity, the first identity differs from the second identity; the first identity is a Physical Cell Identifier and the second identity is a Physical Cell Identifier; the first radio signal is transmitted on a first time-frequency resource set and the first signaling explicitly indicates the first time-frequency resource set; the first signaling is Downlink Control Information; the first feature identity is a Sidelink Synchronization Sequence Identity; the first feature identity is used for generating the first signature sequence; and the first feature identity is an integer not smaller than 0 and not greater than 167;

the receiving timing of the second radio signal is used for determining the transmitting timing of the first radio signal;

the second radio signal is associated with the second synchronization sequence, and the first synchronization sequence differs from the second synchronization sequence;

a transmitter of the first signaling corresponds to a first node, and a transmitter of the second radio signal corresponds to a second node; and the first node is a serving cell corresponding to the UE, the second node is a neighbor cell of the serving cell corresponding to the UE, and the first radio signal is transmitted on a sidelink.

2. The method according to claim 1, comprising:
receiving first information;
wherein at least one measurement from the following set of measurements of: {a channel measurement for a third link, a channel measurement for a fourth link} is used for determining the first information; a radio channel from the first node to a transmitter of the first information corresponds to the third link, and a radio channel from the second node to the transmitter of the first information corresponds to the fourth link.

3. The method according to claim 2, comprising:
transmitting a second signaling;
wherein the second signaling is used for triggering the transmission of the first information; at least one measurement from the following set of measurements {a channel measurement for a first link, a channel measurement for a second link} is used for determining the second signaling; and a radio channel from the first node to the transmitter of the first radio signal corresponds to the first link, and a radio channel from the second node to the transmitter of the first radio signal corresponds to the second link.

4. The method according to claim 2, comprising:
transmitting second information;
wherein the first information is used for determining the second information; and the second information is used for determining the first signaling.

5. The method according to claim 1, wherein the first node and the second node are non-co-sited.

6. The method according to claim 1, comprising:
handing over from a first cell to a second cell;
transmitting a third radio signal;
wherein the first cell refers to the first node, the second cell refers to the second node; and the receiving timing for the second cell is used for determining the transmitting timing of the third radio signal.

7. A method in a base station for wireless communication, comprising:

transmitting a first signaling or transmitting a second radio signal;
wherein the first signaling is correlated to a first synchronization sequence, the first signaling indicates a first feature identity and a second identity, and a first signature sequence is used for generating a first radio signal, a second synchronization sequence corresponds to the second identity; the first synchronization sequence corresponds to a first identity, the first identity differs from the second identity; the first identity is a Physical Cell Identifier and the second identity is a Physical Cell Identifier; the first radio signal is transmitted on a first time-frequency resource set and the first signaling explicitly indicates the first time-frequency resource set; the first signaling is Downlink Control Information; the first synchronization sequence differs from the second synchronization sequence; the first radio signal is transmitted on a sidelink; the first feature identity is a Sidelink Synchronization Sequence Identity; the first feature identity is used for generating the first signature sequence; and the first feature identity is an integer not smaller than 0 and not greater than 167.

8. The method according to claim 7, comprising:
receiving second information;
wherein the base station transmits the first signaling; a piece of first information is used for determining the second information; the second information is used for determining the first signaling; at least one measurement from the following set of measurements of: {a channel measurement for a third link, a channel measurement for a fourth link} is used for determining the first information; a radio channel from the transmitter of the first signaling to a transmitter of the first information corresponds to the third link; and a radio channel from the transmitter of the second radio signal to the transmitter of the first information corresponds to the fourth link.

9. The method according to claim 8, wherein the second signaling is used for triggering the transmission of the first information; at least one measurement from the following set of measurements {a channel measurement for a first link, a channel measurement for a second link} is used for determining the second signaling; a radio channel from the transmitter of the first signaling to a transmitter of the first radio signal corresponds to the first link; and a radio channel from the transmitter of the second radio signal to a transmitter of the first radio signal corresponds to the second link.

10. The method according to claim 8, comprising:
processing third information by a second operation;
processing fourth information by a second execution;
wherein the second information is used for determining the third information; the third information is transmitted on a backhaul link; the third information is used for determining that at least the former one of {the transmitter of the first radio signal, the transmitter of the first information} initiates a handover request; the fourth information is used for acknowledging that the third information is correctly received; the fourth information is used for determining at least the first signature sequence; the fourth information is transmitted on the backhaul link; the base station transmits the first signaling, the second operation is transmitting, and the second execution is receiving; or the base station transmits the second radio signal, the second operation is receiving and the second execution is transmitting.

11. The method according to claim 7, wherein the transmitter of the first signaling and the transmitter of the second radio signal are non-co-sited.

12. The method according to claim 7, comprising:
detaching a first terminal and a second terminal from a first cell, or establishing two connections for the first terminal and the second terminal in the second cell respectively;
wherein the base station transmits the first signaling, the base station detaches the first terminal and the second terminal from the first cell, the first cell refers to a serving cell corresponding to the transmitter of the first signaling; or the base station transmits the second radio signal, the base station establishes two connections for the first terminal and the second terminal respectively in the second cell, the second cell refers to a serving cell corresponding to the transmitter of the second radio signal; the first terminal is the transmitter of the first radio signal, and the second terminal is the transmitter of the first information.

13. A User Equipment (UE) for wireless communication, comprising:
a first processing module, to receive a first signaling and a second radio signal;
a second processing module, to transmit a first radio signal;
wherein:
the first signaling is correlated to a first synchronization sequence, the first signaling indicates a first feature identity and a second identity, and a first signature sequence is used for generating the first radio signal, a second synchronization sequence corresponds to the second identity; the first synchronization sequence corresponds to a first identity, the first identity differs from the second identity; the first identity is a Physical Cell Identifier and the second identity is a Physical Cell Identifier; the first radio signal is transmitted on a first time-frequency resource set and the first signaling explicitly indicates the first time-frequency resource set; the first signaling is Downlink Control Information; the first feature identity is a Sidelink Synchronization Sequence Identity; the first feature identity is used for generating the first signature sequence; and the first feature identity is an integer not smaller than 0 and not greater than 167;
the receiving timing of the second radio signal is used for determining the transmitting timing of the first radio signal;
the second radio signal is associated with the second synchronization sequence, the first synchronization sequence differs from the second synchronization sequence; a transmitter of the first signaling corresponds to a first node, and a transmitter of the second radio signal corresponds to a second node; and
the first node is a serving cell corresponding to the UE, the second node is a neighbor cell of the serving cell corresponding to the UE, and the first radio signal is transmitted on a sidelink.

14. The UE according to claim 13, wherein the second processing module receives first information and transmits a second signaling; at least one measurement from the following set of measurements of: {a channel measurement for a third link, a channel measurement for a fourth link} is used for determining the first information; a radio channel from the first node to a transmitter of the first information corresponds to the third link, and a radio channel from the second node to the transmitter of the first information corresponds to the fourth link; the second signaling is used for triggering the transmission of the first information; at least one measurement from the following set of measurements of: {a channel measurement for a first link, a channel measurement for a second link} is used for determining the second signaling; and a radio channel from the first node to the transmitter of the first radio signal corresponds to the first link, and a radio channel from the second node to the transmitter of the first radio signal corresponds to the second link.

15. The UE according to claim 13, wherein the first processing module transmits second information; the first information is for determining the second information; and the second information is for determining the first signaling.

16. The UE according to claim 13, wherein the first processing module hands over from a first cell to a second cell, and the second processing module transmits a third radio signal; the first cell refers to the first node, the second cell refers to the second node;
and the receiving timing for the second cell is for determining the transmitting timing of the third radio signal.

17. A base station device for wireless communication, comprising:
a third processing module, to transmit a first signaling, or to transmit a second radio signal;
wherein the first signaling is correlated to a first synchronization sequence, the first signaling indicates a first feature identity and a second identity, and a first signature sequence is used for generating a first radio signal; a second synchronization sequence corresponds to the second identity; the first synchronization sequence corresponds to a first identity, the first identity differs from the second identity; the first identity is a Physical Cell Identifier and the second identity is a Physical Cell Identifier; the first radio signal is transmitted on a first time-frequency resource set and the first signaling explicitly indicates the first time-frequency resource set; the first signaling is Downlink Control Information; the receiving timing of the second radio signal is used for determining the transmitting timing of the first radio signal; the second radio signal is associated with the second synchronization sequence; the first synchronization sequence differs from the second synchronization sequence; and the first radio signal is transmitted on a sidelink; the first feature identity is a Sidelink Synchronization Sequence Identity; the first feature identity is used for generating the first signature sequence; and the first feature identity is an integer not smaller than 0 and not greater than 167.

18. The base station device according to claim 17, wherein the third processing module transmits the first signaling and receiving second information; a piece of first information is for determining the second information; the second information is for determining the first signaling; at least one measurement from the following set of measurements of: {a channel measurement for a third link, a channel measurement for a fourth link} is for determining the first information; a radio channel from the transmitter of the first signaling to a transmitter of the first information corresponds to the third link; and a radio channel from the transmitter of the second radio signal to the transmitter of the first information corresponds to the fourth link.

19. The base station device according to claim 17, wherein the third processing module detaches a first terminal and a second terminal from a first cell, or the third processing module establishes two connections for the first terminal and the second terminal in the second cell respectively; if the base station device transmits the first signaling, the base station device detaches the first terminal and the second terminal from the first cell, the first cell refers to a serving cell corresponding to the transmitter of the first signaling; or the base station device transmits the second radio signal, the base station device establishes two connections for the first terminal and the second terminal respectively in the second cell, the second cell refers to a serving cell corresponding to the transmitter of the second radio signal; the first terminal is the transmitter of the first radio signal, and the second terminal is the transmitter of the first information.

20. The base station device according to claim 17, wherein the base station device comprising:
   a fourth processing module, to process third information by a second operation and process fourth information by a second execution, wherein, the second information is for determining the third information; the third information is transmitted on a backhaul link; the third information is for determining that at least the former one of {the transmitter of the first radio signal, the transmitter of the first information} initiates a handover request; the fourth information is for acknowledging that the third information is correctly received; the fourth information is for determining at least the first signature sequence; the fourth information is transmitted on the backhaul link; the third processing module transmits the first signaling, the second operation is transmitting, and the second execution is receiving; or the third processing module transmits the second radio signal, the second operation is receiving and the second execution is transmitting.

* * * * *